US012057259B2

(12) United States Patent
Larsson et al.

(10) Patent No.: US 12,057,259 B2
(45) Date of Patent: Aug. 6, 2024

(54) TRANSFORMER ARRANGEMENT AND METHOD FOR ASSEMBLING A TRANSFORMER ARRANGEMENT

(71) Applicant: Hitachi Energy Ltd, Zürich (CH)

(72) Inventors: Tommy Larsson, Ludvika (SE); Christer Arnborg, Gävle (SE); Aliae Welander, Borlänge (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/273,307

(22) PCT Filed: Sep. 20, 2022

(86) PCT No.: PCT/EP2022/076030
§ 371 (c)(1),
(2) Date: Jul. 20, 2023

(87) PCT Pub. No.: WO2023/041792
PCT Pub. Date: Mar. 23, 2023

(65) Prior Publication Data
US 2024/0087805 A1 Mar. 14, 2024

(30) Foreign Application Priority Data
Sep. 20, 2021 (EP) .................................... 21197852

(51) Int. Cl.
*H01F 29/02* (2006.01)
*H01H 9/00* (2006.01)

(52) U.S. Cl.
CPC ........... *H01F 29/02* (2013.01); *H01H 9/0044* (2013.01); *H01H 2009/0061* (2013.01)

(58) Field of Classification Search
CPC ........ H01F 29/02; H01F 29/025; H01F 29/00; H01F 29/08; H01H 9/0044;
(Continued)

(56) References Cited

U.S. PATENT DOCUMENTS 8,581,097 B2 * 11/2013 Ward ........................ H05K 7/14
174/50
9,865,409 B2 * 1/2018 Reich ................... H01H 9/0044
(Continued)

FOREIGN PATENT DOCUMENTS

CN 103493161 A 1/2014
EP 4310875 A1 * 1/2024 ............. H01F 27/02
(Continued)

OTHER PUBLICATIONS

First Office Action and Search Report for Chinese Patent Application No. 202280008172.6, mailed Sep. 22, 2023, 5 pages.
(Continued)

*Primary Examiner* — Angel R Estrada
(74) *Attorney, Agent, or Firm* — Sage Patent Group

(57) ABSTRACT

A transformer arrangement includes a transformer, a transformer tank and at least one tap changer that is arranged to be connected to said transformer. The transformer arrangement further includes at least one support structure which is arranged to be connected to the tap changer and to extend between the tap changer and at least two support members located between the tap changer and at least two points on an inner surface of the transformer tank. The at least one support structure is arranged to reduce pendular movement of the tap changer.

14 Claims, 5 Drawing Sheets

(58) Field of Classification Search
CPC ... H01H 2009/0061; H01H 2009/0055; H01H 9/02; H01H 9/00; H02G 3/08; H02G 3/081; H05K 5/00; H05K 5/02
USPC .... 174/63, 50, 17 R, 520, 61; 361/600, 601, 361/602, 603, 620, 679.01; 312/223.1, 312/223.6
See application file for complete search history.

(56) References Cited

U.S. PATENT DOCUMENTS

| | | | | |
|---|---|---|---|---|
| 11,545,313 | B2 * | 1/2023 | Hoepfl ................. | H01H 9/0038 |
| 2014/0034464 | A1 | 2/2014 | Larsson et al. | |

FOREIGN PATENT DOCUMENTS

| | | | |
|---|---|---|---|
| JP | S5632707 | A | 4/1981 |
| JP | H10275731 | A | 10/1998 |
| JP | 2005005401 | A | 1/2005 |
| SE | 1951253 | A1 | 11/2019 |
| WO | 2021106066 | A1 | 6/2021 |

OTHER PUBLICATIONS

International Search Report and Written Opinion of the International Searching Authority, PCT/EP2022/076030, mailed Jan. 4, 2023, 11 pages.

* cited by examiner

TRANSFORMER ARRANGEMENT AND METHOD FOR ASSEMBLING A TRANSFORMER ARRANGEMENT

CROSS REFERENCE TO RELATED APPLICATIONS

This application is a 35 U.S.C. § 371 national stage application of PCT International Application No. PCT/EP2022/076030 filed on Sep. 20, 2022, which in turn claims priority to European Patent Application No. 21197852.3, filed on Sep. 20, 2021, the disclosures and content of which are incorporated by reference herein in their entirety.

FIELD OF THE DISCLOSURE

The disclosure relates to the field of transformers. In particular the disclosure relates to handling movement of a tap changer in a transformer.

BACKGROUND

A power transformer is equipment used in an electric grid of a power system. Power transformers transform voltage and current in order to transport and distribute electric energy.

A tap-changer is used to change the turn ratio between windings in a transformer. This ratio determines the voltage ratio between the windings and is essential for the stabilization of network voltage under variable load conditions. Tap changers usually exist in two primary types, no-load tap changers (NLTC) and on-load tap changers (OLTC). A NLTC, also known as off-circuit tap changer (OCTC) or de-energized tap changer (DETC), is a tap changer utilized in situations in which a transformer's turn ratio does not require frequent changing and it is permissible to de-energize the transformer system. This type of transformer is frequently employed in low power, low voltage transformers in which the tap point often may take the form of a transformer connection terminal, requiring the input line to be disconnected by hand and connected to the new terminal. An OLTC, also known as on-circuit tap changer (OCTC), is a tap changer in applications where a supply interruption during a tap change is unacceptable, the transformer is often fitted with a more expensive and complex on load tap changing mechanism. OLTCs may be generally classified as either mechanical, electronically assisted, or fully electronic.

When transformers are introduced on floating platforms out in the sea, new types of mechanical load conditions will be present. Such conditions are alternating accelerations in different directions due to waves in the sea.

An in-tank tap changer is a tap changer that is located inside a transformer tank. In-tank tap changers are normally only fixated towards a transformer tank cover, which is satisfying if there are not any repetitive alternating accelerations present. However, continuous alternating accelerations, especially in the horizontal plane, could cause fatigue in different parts of this fixation towards the transformer tank cover. There is need for a solution that will help the tap changer sustain repetitive changes in horizontal acceleration both regarding high magnitude and number.

The present disclosure presents an improved viable solution of a transformer arrangement that handles the issues described above.

SUMMARY

It is an object of embodiments herein to handle movement of a tap changer in a transformer, or at least to achieve an alternative to known solutions within the technical field.

According to an aspect the object is achieved by providing a transformer arrangement. The transformer arrangement comprises a transformer, a transformer tank and at least one tap changer. The tap changer is arranged to be connected to said transformer. The transformer arrangement further comprises at least one support structure. The support structure is arranged to be connected to the tap changer and to extend between the tap changer and at least one support member. The at least one support member is located between the tap changer and at least one point on an inner surface of the transformer tank. The at least one support structure is arranged to reduce pendular movement of the tap changer.

According to another aspect the above-mentioned object is also achieved by providing a method for assembling a transformer arrangement. The transformer arrangement comprises a transformer, a transformer tank and at least one tap changer. The transformer arrangement further fixates a support structure to the tap changer and at least one support member located between the tap changer and at least one point on an inner surface of the transformer tank. The support structure is arranged to reduce pendular movement of the tap changer.

It is furthermore provided herein use of a transformer arrangement wherein the transformer arrangement is located on a floating platform.

Embodiments herein are based on the realisation that by providing a transformer arrangement comprising at least one support structure arranged between a tap changer and at least two support members, wherein the at least two support members are connected to an inner surface of a transformer tank, the tap changer is supported by an additional support towards the transformer tank. Thereby pendular movement of the tap changer can be reduced and thus the movement of the tap changer is handled in an efficient manner.

BRIEF DESCRIPTION OF THE FIGURES

Further technical features of the disclosure will become apparent through the following description of one or several exemplary embodiments given with reference to the appended figures, where.

It should be noted that the drawings have not necessarily been drawn to scale and that the dimensions of certain elements may have been exaggerated for the sake of clarity.

DETAILED DESCRIPTION

Figure 1A:
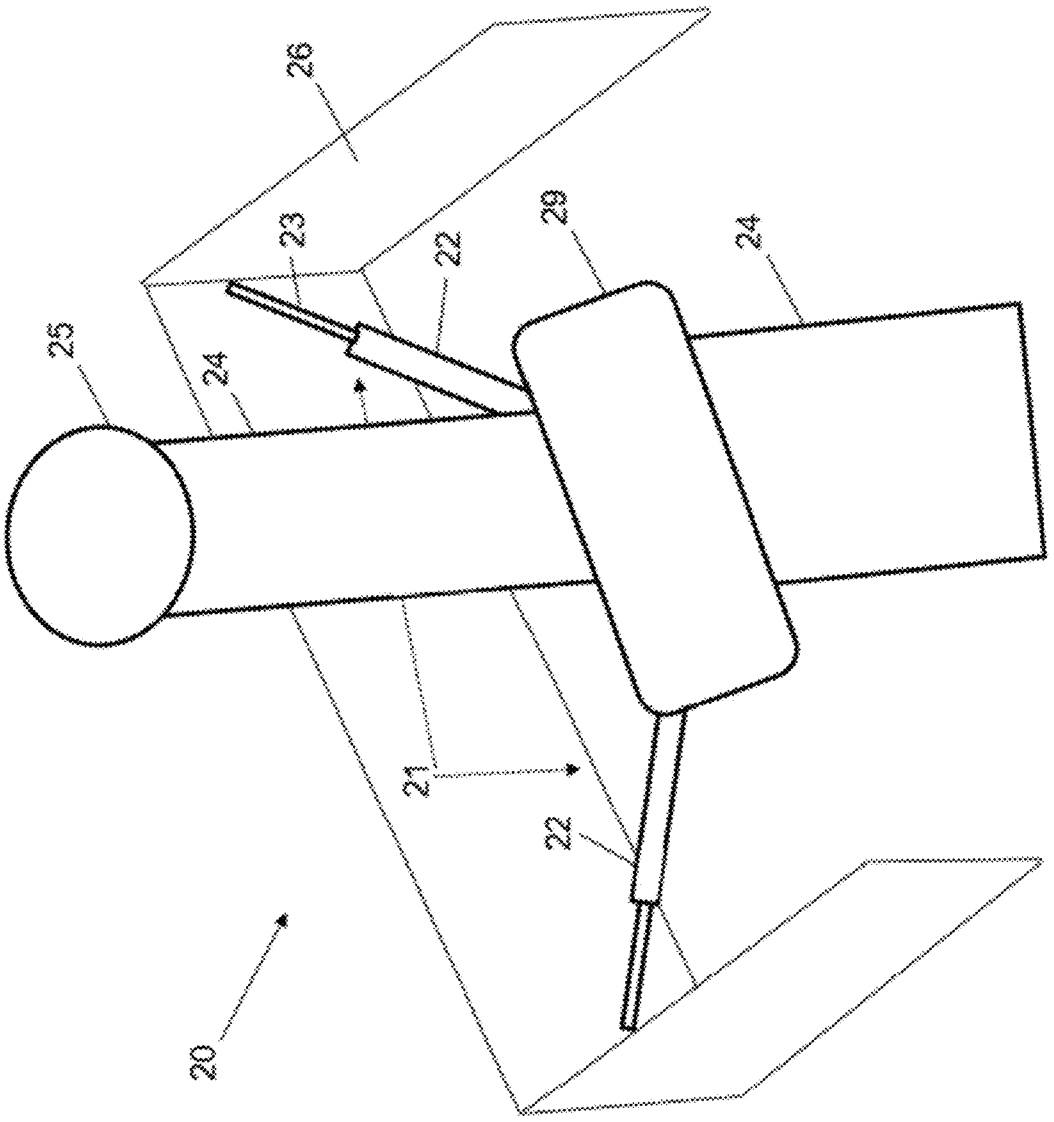
FIG. 1*a* is a schematic overview depicting a transformer arrangement according to embodiments herein.

A transformer arrangement 20 according to embodiments herein is illustrated in FIG. 1*a*. The transformer arrangement 20 comprises a transformer, a transformer tank 26 and at least one tap changer 24. The tap changer 24, which may be an OLTC, is arranged to be connected, e.g. fixated, to the transformer. The tap changer 24 may comprise at least one tap selector 29 that extends in a longitudinal direction of the transformer. The transformer arrangement 20 further comprises at least one support structure 21 which is arranged to be connected to the tap changer 24 and to extend between the tap changer 24 and at least two support members 22 located between the tap changer 24 and at least two points on an inner surface of the transformer tank 26. According to some embodiments the support structure 21 may be connected to the tap changer 24 at a height that is within 10% of the height of a centre of gravity of said tap changer 24. I.e. the support structure 21 may be connected close to the tap changer 24 centre of gravity. According to some embodiments the transformer tank 26 comprises at least one corner and the support structure 21 may be arranged to be connected to the tap changer 24 and to extend between the tap changer 24 and the at least one corner of the transformer tank 26. According to some embodiments the transformer tank 26 comprises at least one beam structure and the support structure 21 may be arranged to be connected to the tap changer 24 and to extend between the tap changer 24 and the at least one beam structure of the transformer tank 26. According to some embodiments the transformer arrangement 20 comprises at least one adjusting means 23, located between the at least two support members 22 and the at least two points on the inner surface of the transformer tank 26. The support structure 21 may further comprise at least one sensor and/or at least one accelerometer (not shown) for monitoring the transformer arrangement 20.

Figure 1B:
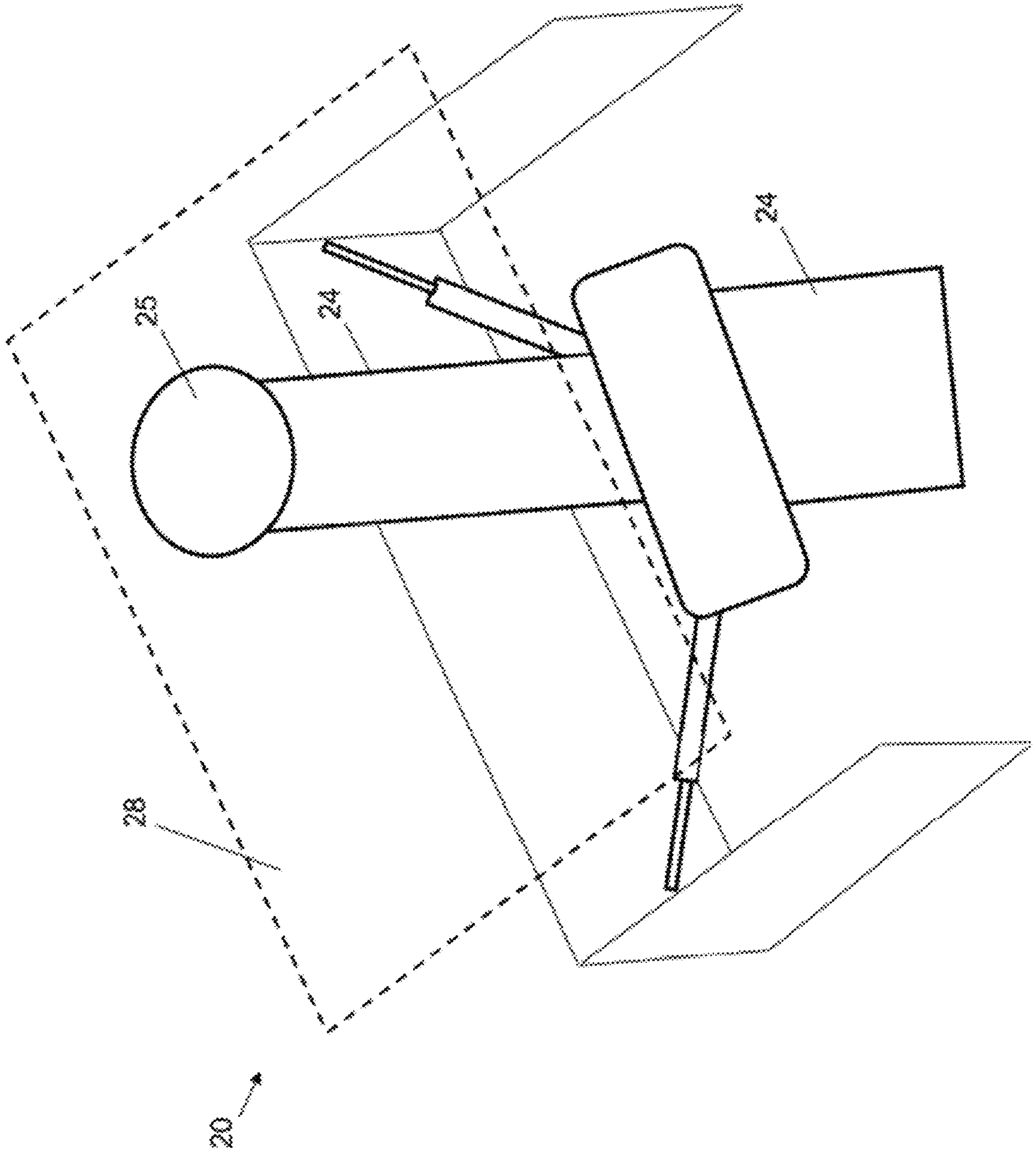
FIG. 1*b* is a schematic overview depicting a transformer arrangement according to some embodiments herein.

According to some embodiments the tap changer 24 of the transformer arrangement comprises a cover flange 25, e.g. a tap changer top flange, and the tap changer 24 is arranged to be fixated to a transformer cover 28 via the cover flange 25. This is illustrated in FIG. 1*b*.

Figure 1C:
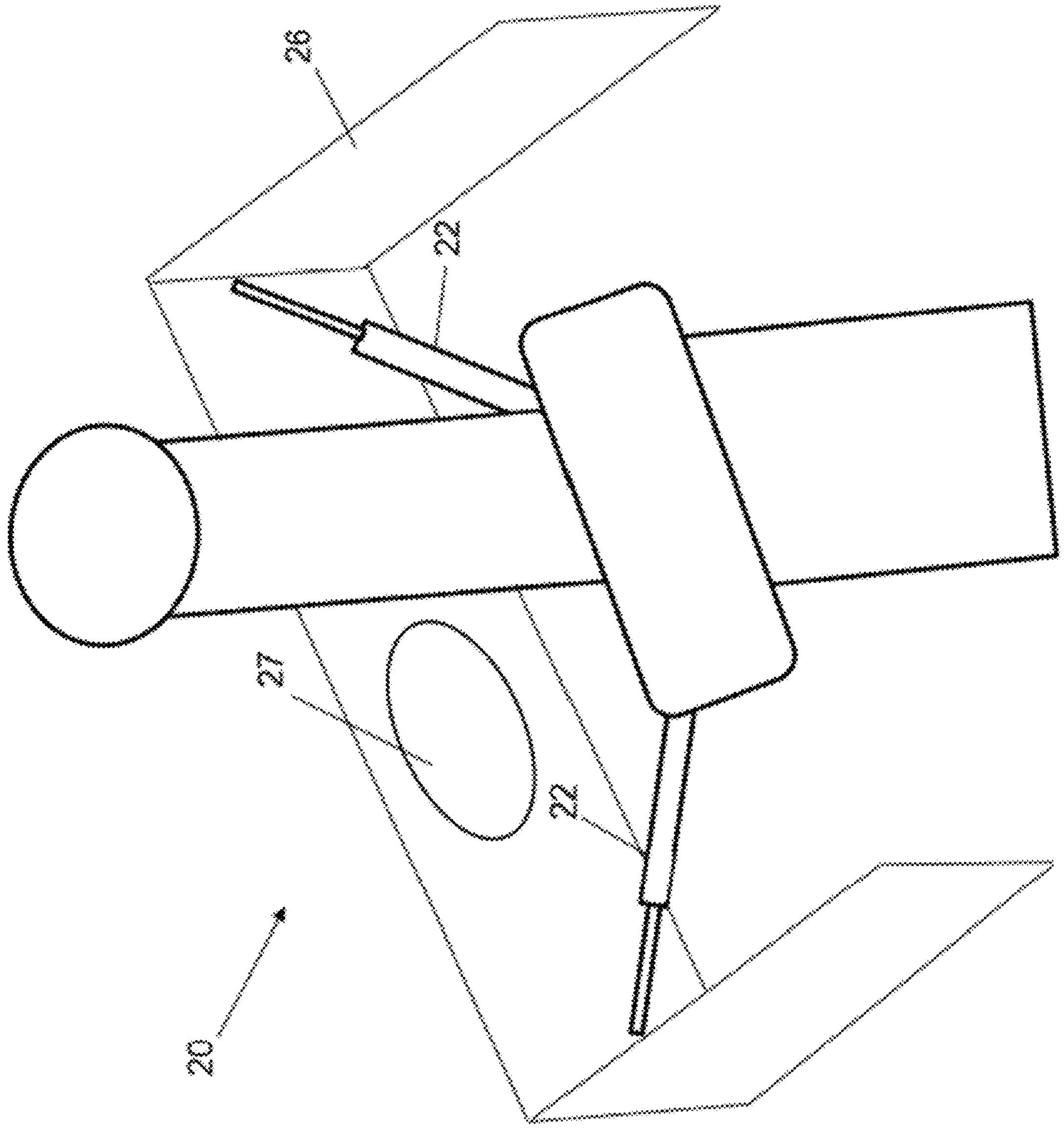
FIG. 1*c* is another schematic overview depicting a transformer arrangement according to some embodiments herein.

The transformer arrangement 20 may also comprise means such as a manhole and/or a handhole 27. The manhole and/or the handhole 27 may be located on the transformer tank 26. The manhole and/or the handhole 27 may be used to enable access for connecting the at least one support member 22 with the transformer tank 26. The connection of the at least one support member 22 with the transformer tank 26 may then be adjusted by using the adjusting means 23. FIG. 1*c* is illustrates the transformer arrangement 20 comprising the handhole 27.

The at least one support structure 21 is arranged to reduce pendular movement of the tap changer 24. The transformer arrangement 20 thus hinders the pendulum movement, e.g. motion, of the tap changer 24 by adding the at least one support structure 21. The pendulum movement of the tap changer 24 may be reduced around the top fixation, e.g. around the cover flange 25, by reducing movement in the horizontal plane of lower parts of the tap changer 24. Thereby the tap changer 24 is not only fixated to the transformer, e.g. to the transformer cover 28 via the cover flange 25, as the support structure 21 is an additional support towards the transformer tank 26, and/or towards a point related to the tank wall, for avoiding pendular motion of the tap changer 24.

Figure 2:
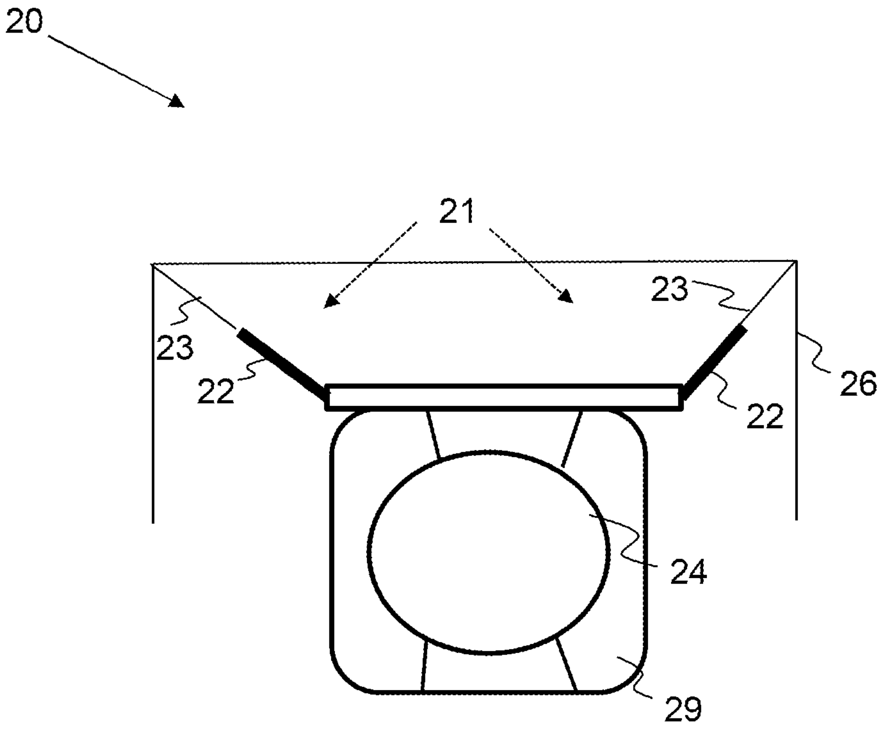
FIG. 2 is another schematic overview depicting a transformer arrangement according to embodiments herein.

FIG. 2 illustrates a schematic overview of the transformer arrangement 20 according to embodiments herein. As mentioned above, the transformer arrangement 20 comprises a support structure 21 arranged to be connected to the tap changer 24 and to extend between the tap changer 24 and at least two support members 22 located between the tap changer 24 and at least two points on an inner surface of the transformer tank 26. The tap changer 24 may be an in-tank tap changer. According to some embodiments the at least one support member 22 may comprise an electrical insulated material. Examples of electrical insulating materials that the support member may comprise is fiberglass reinforced polyester. The at least one support structure 21 may be fixated closely to the tap changer 24 centre of gravity and extend towards at least one point on an inner surface of the transformer tank 26. The at least two points on the inner part of the transformer tank 26 may be a part not being influenced by pressure change, i.e. does not move, during vacuum filling, oil filling or lifting of the transformer. Such part of the transformer tank 26 may be the corner, an additional beam structure or a stiff part of the transformer tank 26. According to some embodiments the transformer arrangement 20 comprises at least one adjusting means 23, located between the at least one support member 22 and the at least one point on the inner surface of the transformer tank 26. The at least one adjusting means 23 may make the at least two support members 22 adjustable between the transformer tank 26 and the tap changer 24. FIG. 2 also shows a tap selector 29, and the tap changer 24 may comprise at least one tap selector 29 that extends in a longitudinal direction of the transformer. The tap selector 29 may comprise a fine tap selector and/or a change-over selector.

Figure 3:
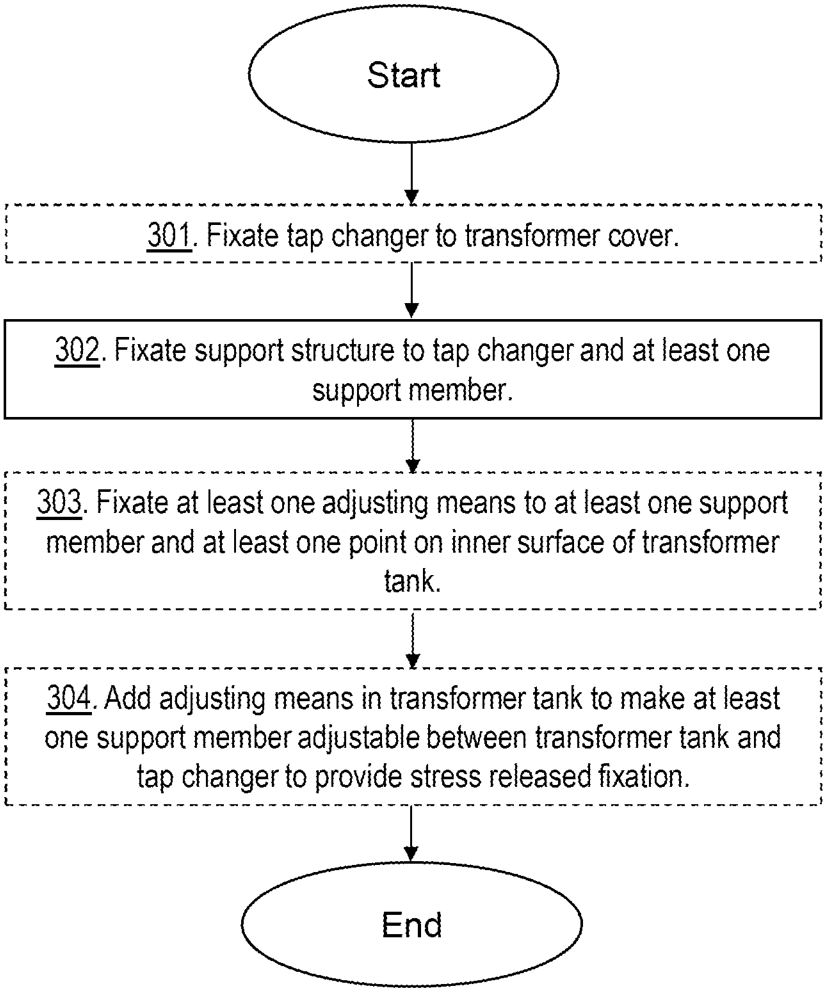
FIG. 3 is a flow chart showing a method for assembling a transformer arrangement according to embodiments herein.

The method actions for assembling a transformer arrangement 20, according to embodiments herein, will now be described with reference to a flowchart depicted in FIG. 3. The actions do not have to be taken in the order stated below but may be taken in any suitable order. Actions performed in some embodiments are marked with dashed boxes. The transformer arrangement 20 comprises transformer, a transformer tank 26 and at least one tap changer 24.

Action 301.

The transformer arrangement 20 may fixate the tap changer 24 to the transformer cover 28. The tap changer may be an OLTC. According to some embodiments the transformer comprises a cover flange 25 and fixating the tap changer 24 to the transformer cover 28 may comprise fixating the tap changer 24 to the transformer cover 28 via the cover flange 25. Furthermore, fixation in horizontal direction after tanking of the transformer and after fixation of the tap changer 24 to the transformer cover 28, e.g. top cover, may also support all today used assembly methods such as cover mounted or fork mounted tap changers.

Action 302.

The transformer arrangement 20 then fixates the support structure 21 to the tap changer 24 and at least two support members 22 located between the tap changer 24 and at least two points on an inner surface of the transformer tank 26. The at least two support members 22 may comprise an electrically insulating material. The support structure 21 may be connected, e.g. fixated, to the tap changer 24 at a height that is within 10% of the height of a centre of gravity of said tap changer 24. The transformer tank 26 may comprise at least one corner and the support structure 21 may be arranged to be connected to the tap changer 24 and to extend between the tap changer 24 and the at least one corner of the transformer tank 26. The transformer tank 26 may comprise at least one beam structure and the support structure 21 may be arranged to be connected to the tap changer 24 and to extend between the tap changer 24 and the at least one beam structure of the transformer tank 26.

The support structure 21 is thus arranged to reduce pendular movement of the tap changer 24.

Action 303.

The transformer arrangement 20 may fixate the at least one adjusting means 23 to the at least two support members 22 and the at least two points on the inner surface of the transformer tank 26.

Action 304.

The transformer arrangement 20 may add adjusting means 23 in the transformer tank 26 to make the at least two support members 22 adjustable between the transformer tank 26 and the tap changer 24 to provide stress released fixation.

An advantage with embodiments herein is that the tap changer can withstand repetitive changes in horizontal acceleration both regarding high magnitude and number.

Another advantage of embodiments herein is that the risk of oil leakage between the transformer and the tap changer 24 will be reduce by hindering the pendulum motion that could start wearing the sealing system.

Another advantage of embodiments herein is also improvement of earthquake performance.

According to embodiments herein the transformer arrangement 20 is located on a floating platform. The transformer arrangement 20 may come to its best use for floating applications as waves will add inclinations and alternating accelerations in all directions. In such floating applications the tap changer 24, e.g. in-tank tap changer, needs to improve performance in the horizontal plane direction. The vertical direction is normally already strong enough due to existing gravity and internal pressure withstand of the tap changer 24 acting in the same direction and thereby already considered.

It is to be noted that any feature of any of the aspects may be applied to any other aspect, wherever appropriate. Likewise, any advantage of any of the aspects may apply to any of the other aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

It will be appreciated that the foregoing description and the accompanying drawings represent non-limiting examples of the method and winding arrangement taught herein. As such, the winding arrangement and techniques taught herein are not limited by the foregoing description and accompanying drawings. Instead, the embodiments herein are limited only by the following claims and their legal equivalents.

The invention claimed is:

1. A transformer arrangement comprising:

a transformer;

a transformer tank;

at least one tap changer arranged to be connected to said transformer; and at least one support structure which is arranged to be connected to the tap changer and to extend between the tap changer and at least two support members located between the tap changer and at least two points on an inner surface of the transformer tank, the at least one support structure arranged to reduce pendular movement of the tap changer.

2. The transformer arrangement according to claim 1, wherein the tap changer is an on-load tap changer.

3. The transformer arrangement according to claim 1, wherein the tap changer comprises a cover flange, and wherein the tap changer is arranged to be fixated to a transformer cover via the cover flange.

4. The transformer arrangement according to claim 1, wherein the support structure comprises at least one support member comprising an electrically insulating material.

5. The transformer arrangement according to claim 1, wherein the support structure is connected to the tap changer at a height that is within 10% of the height of a centre of gravity of said tap changer.

6. The transformer arrangement according to claim 1, wherein the transformer tank comprises at least one corner, and wherein the support structure is arranged to be connected to the tap changer and to extend between the tap changer and the at least one corner of the transformer tank.

7. The transformer arrangement according to claim 1, wherein the transformer tank comprises at least one beam structure, and wherein the support structure is arranged to be connected to the tap changer and to extend between the tap changer and the at least one beam structure of the transformer tank.

8. The transformer arrangement according to claim 1, further comprising at least one adjusting means, located between at least one support member and at least one point on the inner surface of the transformer tank.

9. The transformer arrangement according to claim 1, wherein the support structure comprises at least one sensor for monitoring the transformer arrangement.

10. The transformer arrangement according to claim 1, wherein the transformer tank comprises an opening to enable access for connecting the at least one support member of the support structure with the transformer tank.

11. The transformer arrangement according to claim 10, wherein the opening comprises at least one of a manhole and a handhole.

12. The transformer arrangement according to claim 10, further comprising adjustment means located between the at least two support members and the at least two points on the inner surface of the transformer tank, wherein the adjustment means are accessible via the opening.

13. The transformer arrangement according to claim 1, wherein the at least two support members comprise an electrically insulating material.

14. The transformer arrangement according to claim 1, wherein the support structure comprises at least one accelerometer for monitoring the transformer arrangement.

* * * * *